Figure 3:
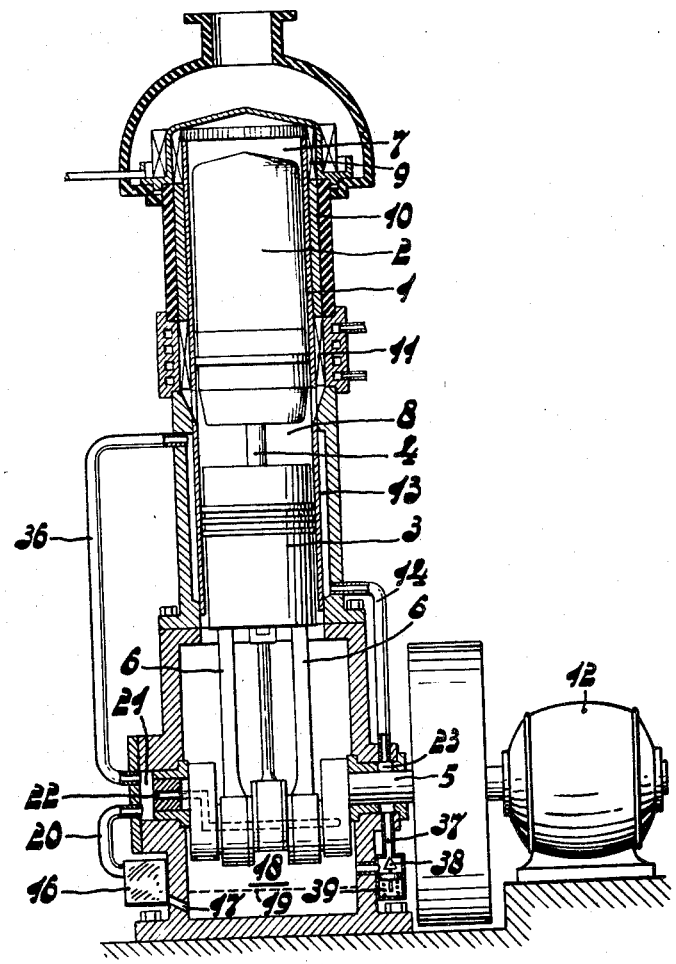

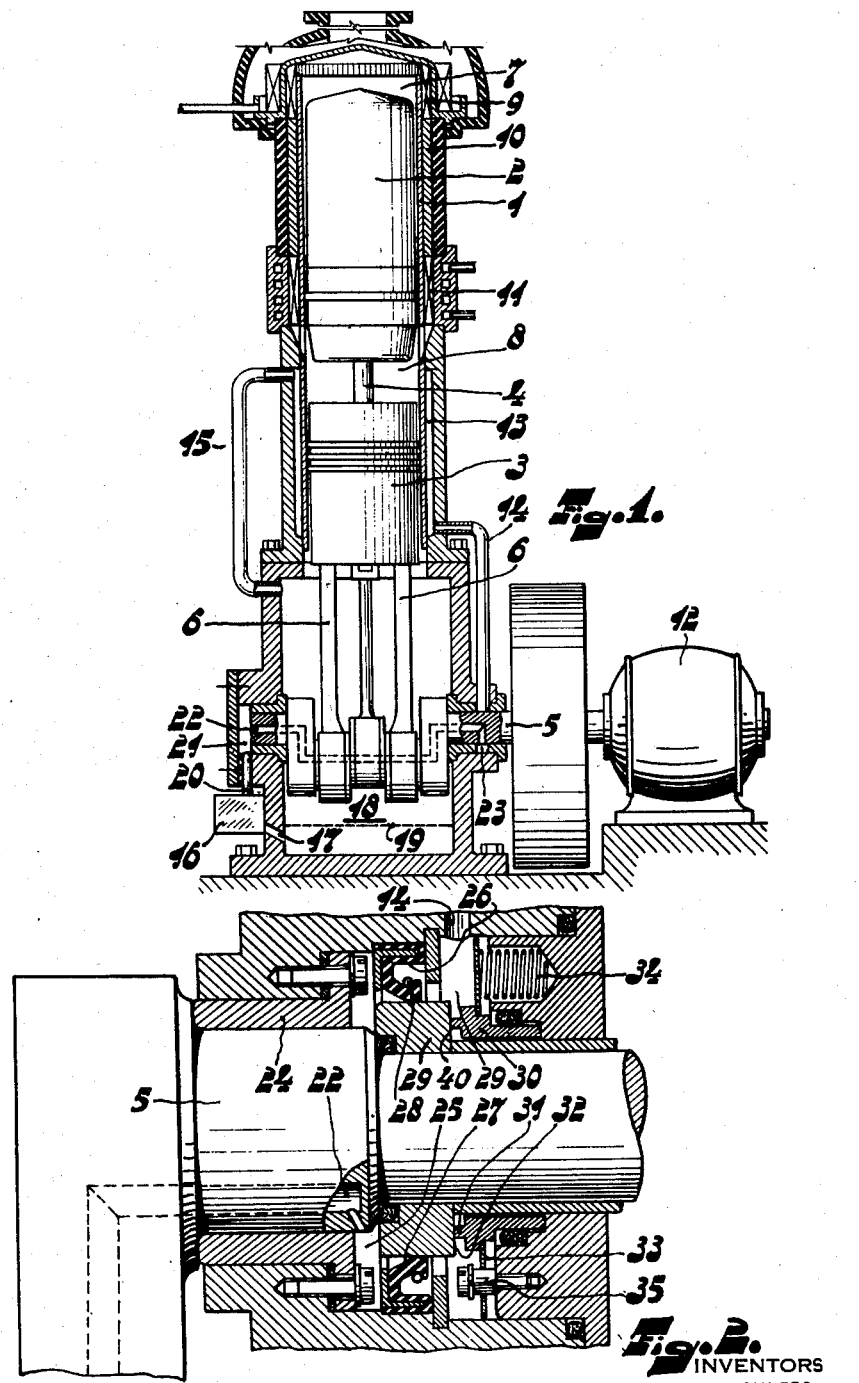

INVENTORS
CORNELIUS OTTO JONKERS
JACOB WILLEM LAURENS KÖHLER
BY
AGENT

# United States Patent Office 2,943,453
Patented July 5, 1960

2,943,453

GASEOUS MEDIUM LEAKAGE PREVENTION ARRANGEMENT FOR A HOT-GAS RECIPROCATING MACHINE

Cornelius Otto Jonkers and Jacob Willem Laurens Köhler, Emmasingel, Eindhoven, Netherlands, assignors, by mesne assignments, to North American Philips Company, Inc., New York, N.Y., a corporation of Delaware Filed Jan. 14, 1955, Ser. No. 481,872

Claims priority, application Netherlands Jan. 22, 1954

6 Claims. (Cl. 62—6)

The invention relates to a hot-gas reciprocating machine having a closed lubricating system and comprising a pump by which lubricant is pumped out of the crank case to one or more points to be lubricated. The term "hot-gas reciprocating machine" is to be understood to mean herein a hot-gas engine, a cold-gas refrigerator and a heat pump, the latter two operating on the reversed hot-gas engine principle. It is known that hot-gas reciprocating machines may be constructed in various ways, for example as a displacer-piston machine, as a double-acting machine, as a machine, the cylinders of which are at an angle to one another or as a cold-gas refrigerator, the working space of which is combined with that of a hot-gas reciprocating machine.

It is known that in a hot-gas reciprocating machine a gas being always in the same state of aggregation performs a closed thermodynamic cycle. The minimum pressure liable to occur in the machine is, as a rule, about 10 atmospheres or even higher, whereas the maximum pressure may be for example 25 atmospheres or higher. The pressure in the crank case will, in general, be equal to the minimum pressure and often to the mean pressure occurring in the cycle. If the machine comprises a crank shaft taken through the wall of the crank case, it is of importance to avoid gas leakage at this through-connection. This is particularly desirable if for example hydrogen is used as a gas in the machine, which is often the case with cold-gas refrigerators. For stuffing the shaft use may preferably be made of a liquid, which is supplied to the space by a pump.

The leakage of gas must, however, also be avoided when the machine is not operating and the pump, consequently, does not supply liquid. At the area to be stuffed provision could be made of a container for liquid which exerts a pressure on the area to be stuffed during the inoperative periods of the pump. With the hot-gas reciprocating machine according to the invention the gas is prevented from leaking out of the machine in a similar manner. With this machine, however, both for the liquid and for the container use is made of means already provided in the machine for other purposes, so that a compact and little complicated machine is obtained.

The hot-gas reciprocating machine according to the invention is furthermore provided with a closed lubricating system; such a lubricating system is often used with other machines, for example internal combustion engines, compression refrigerators and compressors. In a closed lubricating system lubricant is conveyed from a stock container, for example from the crank case to the areas to be lubricated, after which the lubricant is re-supplied to the container.

According to the invention the lubricating system is constructed in a manner such that the lubricant is in thermal contact in a cooling space with the cylinder wall of the machine, while the lubricant serves at the same time to prevent gas from leaking out of the machine; the cooling space is positioned in a manner such that herein the lubricant exerts hydrostatic pressure on the area to be stuffed, provision being made of means to maintain this hydrostatic pressure during the standstill of the machine.

Consequently in this machine the cooling space of the cylinder is used not only for containing the cooling medium for the cylinder but also as a container for a liquid by means of which the machine is rendered gastight. The machine is furthermore cooled by means of lubricant. With hot-gas reciprocating engines and with cold-gas refrigerator in particular especially the so-called cooled space, i.e. the space adjacent the cooler is cooled. To this end use could be made of cooling water, but it has been found according to the invention that lubricant may be used successfully, since the lubricating oil is thus heated and the viscosity increases to an extent such that the mechanical losses of the machine owing to friction decrease.

Since the temperature of the cooled space is comparatively low, there is no risk of too high a temperature of the lubricant, which would otherwise be very undesirable.

According to one aspect of the invention the cooled space of the system lies between the pump and the area to be cooled, which area is adjacent the crank case, while a communication between this area and the crank case comprises a closing device, which interrupts this communication when the pump stops.

According to a further aspect of the invention the closing device is constituted by a valve subjected to a spring, which closes the valve when the pump stops.

A further preferred construction is obtained in accordance with a further embodiment of the invention, if the area to be stuffed of the system lies between the pump and the cooled space, while the communication between this area and the pump includes a check valve in a manner such that the lubricant can flow only from the pump to the area to be stuffed.

In general, the check valve may be constituted by a conventional valve. According to a further aspect of the invention in a machine in which the crank shaft is taken through the wall of the crank case and a lubricant is used for stuffing this through-connection, provision is made at the area of stuffing around the shaft of a ring of elastic material, which serves as a check valve for the system.

In order to ensure that the container constituted by the cooled space is always filled with lubricant, so that always a hydrostatic pressure is maintained on the stuffing area, the duct through which the lubricant is supplied to the cooled space opens out in the cooled space in a further embodiment of the invention.

The invention will be described more fully with reference to two embodiments.

Fig. 1 shows a cold-gas refrigerator comprising a lubricating system according to the invention and Fig. 2 shows on an enlarged scale the area to be stuffed. Fig. 3 shows a further embodiment of the invention.

The refrigerator shown in Fig. 1 is a displacer-piston machine, which comprises a cylinder 1, in which a displacer piston 2 and a piston 3 move up and down. The displacer piston 2 is coupled to this end by way of the connecting-rod system 4 with a crank of the crank shaft 5, whereas the piston 3 is coupled through the connecting-rod system 6 with cranks of the same crank shaft. The displacer-piston acts upon the volume of the space 7, the freezing space and the piston and the displacer piston act upon the volume of a space 8, the cooled space. The two spaces communicate through a freezer 9, a regenerator 10 and a cooler 11 with one another. In the machine a gas, for example hydrogen performs a closed thermo-dynamic cycle, the gas being always in the same state of aggregation.

The machine is driven by an electric motor 12. The cylinder 1 has a cooling space 13 around the space 8; this cooling space has a supply duct 14 and an outlet duct 15. The refrigerator comprises a pump (16) (shown only diagrammatically) which can be driven by the crank shaft. The pump comprises a suction duct 17, which opens out in the crank case 18 below a filter 19. The pump comprises furthermore a compression duct 20, which opens out in a space 21 at one end of the crank shaft. The crank shaft has a duct 22, which conveys the lubricant to the various areas of lubrication, for example to the bearings of the cranks of the machine and if necessary through the connecting rods 6 to piston pins (not shown). Lubricant is also supplied through this duct to a space 23, located on the right-hand side of the crank shaft and the lubricant contained in this space serves to prevent gas from leaking out of the crank case. From this space the lubricant can flow through the duct 14 to the space 13. In this space the lubricant is in thermal contact with the wall of the cylinder 1, so that the latter is cooled, after which the lubricant flows through the duct 15 back to the crank case. If the refrigerator is not in operation and hence the pump does not supply lubricant, the lubricant of the cooling space 13 exerts a hydrostatic pressure in the space 23, so that gas is prevented from leaking out of the crank case. In order to prevent the lubricant from flowing out of the space 23 to the crank case, the system requires a check valve between the space 23 and the pump 16; one embodiment of this check valve will be described with reference to Fig. 2. Fig. 2 shows, on an enlarged scale, the area to be stuffed or sealed. Parts corresponding to those shown in Fig. 1 are designated by the same reference numerals.

The crank shaft 5 is journalled in a bearing 24 and the crank shaft has a duct 22, which opens out in the space 25. A ring 26 of elastic material, for example rubber, serves in this embodiment as a check valve and the lubricant can pass the internal part 27 of the ring to the space 23, but it cannot flow back to the duct 22. From the space 23 no lubricant can flow to the space 25. A spring 28 contributes to the valving effect of the ring 26, so that the part 27 provides a satisfactory seal with the ring 29 provided on the crank shaft. The ring 29 is fixed to shaft 5 and rotates therewith. The sleeve 40 immediately to the right of ring 29 is secured to the fixed cover having springs 34 therein.

Then the lubricant flows through the duct 14 to the cooling space 13 shown in Fig. 1. In order to prevent lubricant from leaking out, provision is made of a ring 30, having a fitting edge 31, which provides a seal with the side 32 of the ring 29. The ring 30 is urged against the ring 29 by means of a metal plate 33 and springs 34. The plate 33 is prevented from rotating by studs 35.

The operation of the lubricating system for the hot gas reciprocating machine disclosed in Figs. 1 and 2 is as follows: a pump 16 which, by means of an underpressure, draws oil from the crankcase 17. Oil is then discharged by pump 16 through pressure duct 20 to chamber 21 and from there through duct 22 in crank shaft 5 to the crankshaft bearings and thereafter through bores in the connecting rods. The oil is further discharged through the crank shaft 5 to chamber 25 and thence to chamber 23 by means of check valve 26. From chamber 23 the lubricating oil is conducted through duct 14, cylinder cooling jacket 13, from which it is discharged into the crankcase by means of duct 15.

In the diagram shown in Fig. 3 the container is located between the pump and the area to be stuffed or sealed. Also in this figure parts corresponding to those shown in Fig. 1 are designated by the same reference numerals.

The lubricant pumped up by the pump 16 can flow partly through the duct 22 to the various points of lubrication and partly through a duct 36 to the space 13. The lubricant is supplied at the top of this space and is supplied through a duct 14 to the space 23; from this space the lubricant can flow back through a duct 37 to the crank case. This duct includes a valve 38, which is subjected to a spring 39, the tension of which is so great that the valve is opened by the lubricant, when the pump is in operation and closed when the machine stands still. In this system also the hydrostatic pressure in the space 23 is maintained.

In the embodiments referred to above use is made of a displacer-piston machine; it will be obvious that the construction according to the invention may be used with other types of hot-gas reciprocating machines, for example in double acting machines.

What is claimed is:

1. A closed lubricating oil system for a hot-gas reciprocating apparatus having a cylinder containing a gaseous medium therein, a piston adapted for reciprocation in said cylinder and forming two spaces therewith, a freezer, regenerator and cooler in series and interconnecting said two spaces, a sealed crankcase having a crank and a crankshaft therein, a pump supplying lubricant from the crankcase to areas to be lubricated, conduit means and oil passages in said crankshaft connected to said pump and for transporting lubricant from one end of said crankshaft through the other end thereof, a cooling chamber surrounding one of said spaces, pipe means operatively connecting said cooling chamber with said passages in said crankshaft whereby when said lubricant is in said cooling chamber the former is in thermal contact with said cylinder to act as a coolant therefor, a discharge duct for conducting lubricant from said cooling chamber back to said crankcase, said lubricant in said pipe means forming a liquid seal between the crankshaft and its bearing in the crankcase, said cooling chamber being located over said liquid seal whereby said lubricant maintains a hydrostatic pressure on the liquid seal when the apparatus is inoperative thereby preventing lubricant leakage through said liquid seal.

2. A closed lubricating system as set forth in claim 1 wherein said seal is located in said conduit means between said pump and said cooling chamber and adjacent to said crankcase, and a closure member controlling communication between said seal and said crankcase when said pump is inoperative.

3. A closed lubricating oil system for a hot-gas reciprocating apparatus having a cylinder containing a gaseous medium therein, a piston adapted for reciprocation in said cylinder and forming two spaces therewith, a freezer, regenerator and cooler in series and interconnecting said two spaces, a sealed crankcase having a crank and a crankshaft therein, a pump supplying lubricant from the crankcase to areas to be lubricated, conduit means and oil passages in said crankshaft connected to said pump and for transporting lubricant from one end of said crankshaft through the other end thereof, a cooling chamber surrounding one of said spaces, pipe means operatively connecting said cooling chamber with said passages in said crank shaft whereby when said lubricant is in said cooling chamber the former is in thermal contact with said cylinder to act as a coolant therefor, a discharge duct for conducting lubricant from said cooling chamber back to said crankcase, said lubricant in said pipe means forming a liquid seal between the crankshaft and its bearing in the crankcase, said cooling chamber being located over said liquid seal whereby said lubricant maintains a hydrostatic pressure on the liquid seal when the apparatus is inoperative thereby preventing lubricant leakage through said liquid seal, and a closure member in said conduit means preventing the flow of lubricant back to the crankcase when said pump is inoperative, said closure member including a valve and a spring which closes said valve when the pump is inoperative.

4. A closed lubricating system as set forth in claim 1 wherein said seal is located in said conduit means between said pump and said cooling chamber, and a check valve which opens only in the direction from the pump to said seal.

5. A closed lubricating oil system for a hot-gas reciprocating apparatus having a cylinder containing a gaseous medium therein, a piston adapted for reciprocation in said cylinder and forming two spaces therewith, a freezer, regenerator and cooler in series and interconnecting said two spaces, a sealed crankcase having a crank and a crankshaft therein, a pump supplying lubricant from the crankcase to areas to be lubricated, conduit means and oil passages in said crankshaft connected to said pump and for transporting lubricant from one end of said crankshaft through the other end thereof, a cooling chamber surrounding one of said spaces, pipe means operatively connecting said cooling chamber with said passages in said crankshaft whereby when said lubricant is in said cooling chamber the former is in thermal contact with said cylinder to act as a coolant therefor, a discharge duct for conducting lubricant from said cooling chamber back to said crankcase, said lubricant in said pipe means forming a liquid seal between the crankshaft and its bearing in the crankcase, said cooling chamber being located over said liquid seal whereby said lubricant maintains a hydrostatic pressure on the liquid seal when the apparatus is inoperative thereby preventing lubricant leakage through said liquid seal, and a ring of yieldable material in said conduit means forming one side of said seal to thereby serve as a check valve for said lubricating oil system.

6. A closed lubricating system as set forth in claim 5 wherein said pipe means has said lubricant therein which is supplied to said cooling chamber and which terminates at the top of said cooling chamber.

References Cited in the file of this patent

UNITED STATES PATENTS

| | | |
|---|---|---|
| 1,802,744 | Wales | Apr. 28, 1931 |
| 2,427,638 | Vilter et al. | Sept. 16, 1947 |
| 2,430,918 | Curry | Nov. 18, 1947 |
| 2,743,120 | Haentjens et al. | Apr. 24, 1956 |